United States Patent
Soryal et al.

(10) Patent No.: US 11,422,845 B2
(45) Date of Patent: Aug. 23, 2022

(54) NATIVE CLOUD LIVE TRAFFIC MIGRATION TO COUNTER SUSPECTED HARMFUL TRAFFIC

(71) Applicant: AT&T Intellectual Property I, L.P., Atlanta, GA (US)

(72) Inventors: Joseph Soryal, Ridgewood, NY (US); Jeffrey Joseph Farah, North Brunswick, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 200 days.

(21) Appl. No.: 16/712,235

(22) Filed: Dec. 12, 2019

(65) Prior Publication Data

US 2021/0182093 A1   Jun. 17, 2021

(51) Int. Cl.
| | |
|---|---|
| G06F 9/455 | (2018.01) |
| H04L 43/08 | (2022.01) |
| H04L 67/10 | (2022.01) |
| H04L 67/148 | (2022.01) |

(52) U.S. Cl.
CPC .......... G06F 9/45558 (2013.01); H04L 43/08 (2013.01); H04L 67/10 (2013.01); H04L 67/148 (2013.01); G06F 2009/45562 (2013.01); G06F 2009/45587 (2013.01); G06F 2009/45591 (2013.01)

(58) Field of Classification Search
None
See application file for complete search history.

(56) References Cited

U.S. PATENT DOCUMENTS

| | | | |
|---|---|---|---|
| 9,935,818 B1 | 4/2018 | Kim et al. | |
| 10,944,764 B2 * | 3/2021 | Mixer | G06F 21/57 |
| 2014/0282539 A1 * | 9/2014 | Sonnek | G06F 9/45558 718/1 |
| 2015/0350188 A1 * | 12/2015 | Gilpin | H04L 63/083 726/9 |
| 2017/0078198 A1 * | 3/2017 | Nellikar | H04L 41/12 |
| 2020/0244674 A1 * | 7/2020 | Arzani | H04L 63/1441 |

* cited by examiner

*Primary Examiner* — Lewis A Bullock, Jr.
*Assistant Examiner* — Melissa A Headly
(74) *Attorney, Agent, or Firm* — Guntin & Gust, PLC; Jay H. Anderson

(57) ABSTRACT

A cloud traffic migration system may be used to counter suspected harmful traffic. For example, a virtual machine (VM) may have a separate security and networking policy called a VM shell. The VM shell may be placed at the VM's interface as a layer of protection. When suspected harmful traffic is detected inside the VM, multiple mini VMs may be created that replicate some functions of the infected VM and the traffic may be grouped and segregated into categories. Each category of traffic may be routed to a mini VM for further analysis. Any traffic confirmed to be harmful may be kept inside the mini VM and subject to restrictive rules. Such restrictive rules may introduce delays to waste the attackers time or resources as well as obtain data for threat analytics.

20 Claims, 8 Drawing Sheets

NATIVE CLOUD LIVE TRAFFIC MIGRATION TO COUNTER SUSPECTED HARMFUL TRAFFIC

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on general-purpose hardware. Each VNF may require one or more virtual machines (VMs) to be instantiated. In turn, VMs may require various resources, such as memory, central processing units (CPUs), and network interfaces or network interface cards (NICs). The operation and management of a large-scale cloud is highly susceptible to anomalies, attacks, and faults. Identifying the root causes is often difficult even with skilled operators.

This background information is provided to reveal information believed by the applicant to be of possible relevance. No admission is necessarily intended, nor should be construed, that any of the preceding information constitutes prior art.

SUMMARY

Disclosed herein are cloud traffic migration system that may be used to counter suspected harmful traffic. In an example, an apparatus may include a processor and a memory coupled with the processor that effectuates operations. The operations may include determining that a first virtual machine (VM) has malfunctioned; obtaining, at a first period, logs of data traffic at the first VM that has malfunctioned, wherein the data traffic to the first VM at the first period passes through a first VM shell; assigning the data traffic to a plurality of groups of data traffic; generating a plurality of sub VMs for each group of the plurality of groups of data traffic; and generating a second VM shell, wherein the second VM shell is an interface to the plurality of sub VMs, wherein the data traffic at a second period passes through the second VM shell.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein is a cloud traffic migration system that may be used to counter suspected harmful traffic. For example, a virtual machine (VM) may interface with a VM shell. The VM shell may be used to separate security and networking policy from a VM.). The VM shell may be placed at the VM's interface as a layer of protection. When suspected harmful traffic is detected inside the VM, multiple mini VMs (e.g., sub VMs) may be created and execute sub functions of the infected VM. The suspected harmful traffic may be grouped and segregated into categories. Each category of traffic may be routed to a mini VM for further analysis. Any traffic confirmed to be harmful may be kept inside the mini VM and subject to restrictive rules. Such restrictive rules may introduce delays to waste the attackers time or resources as well as obtain data for threat analytics.

Figure 1:
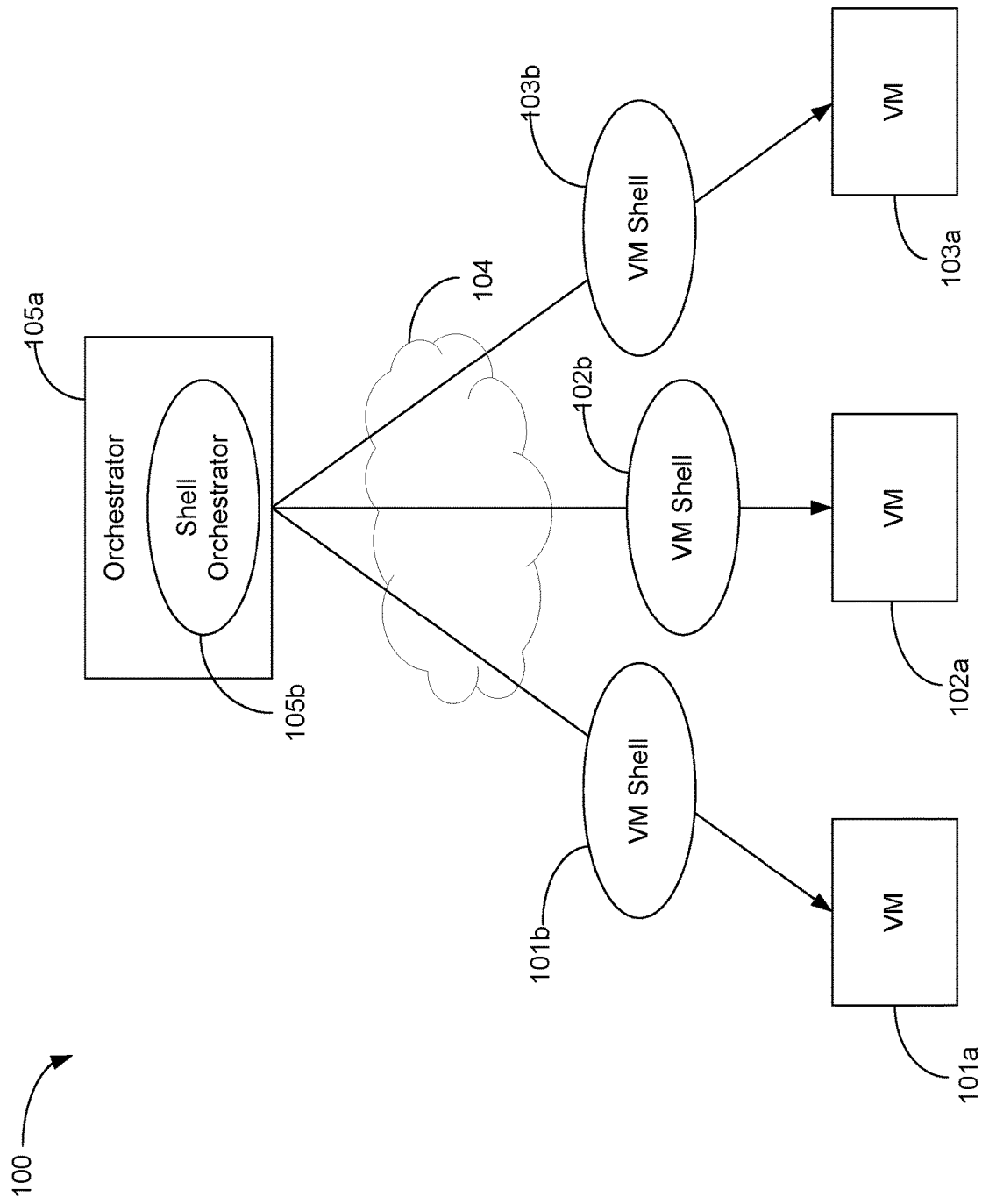
FIG. 1 illustrates an exemplary system for cloud traffic migration that may counter suspected harmful traffic.
Figure 2:
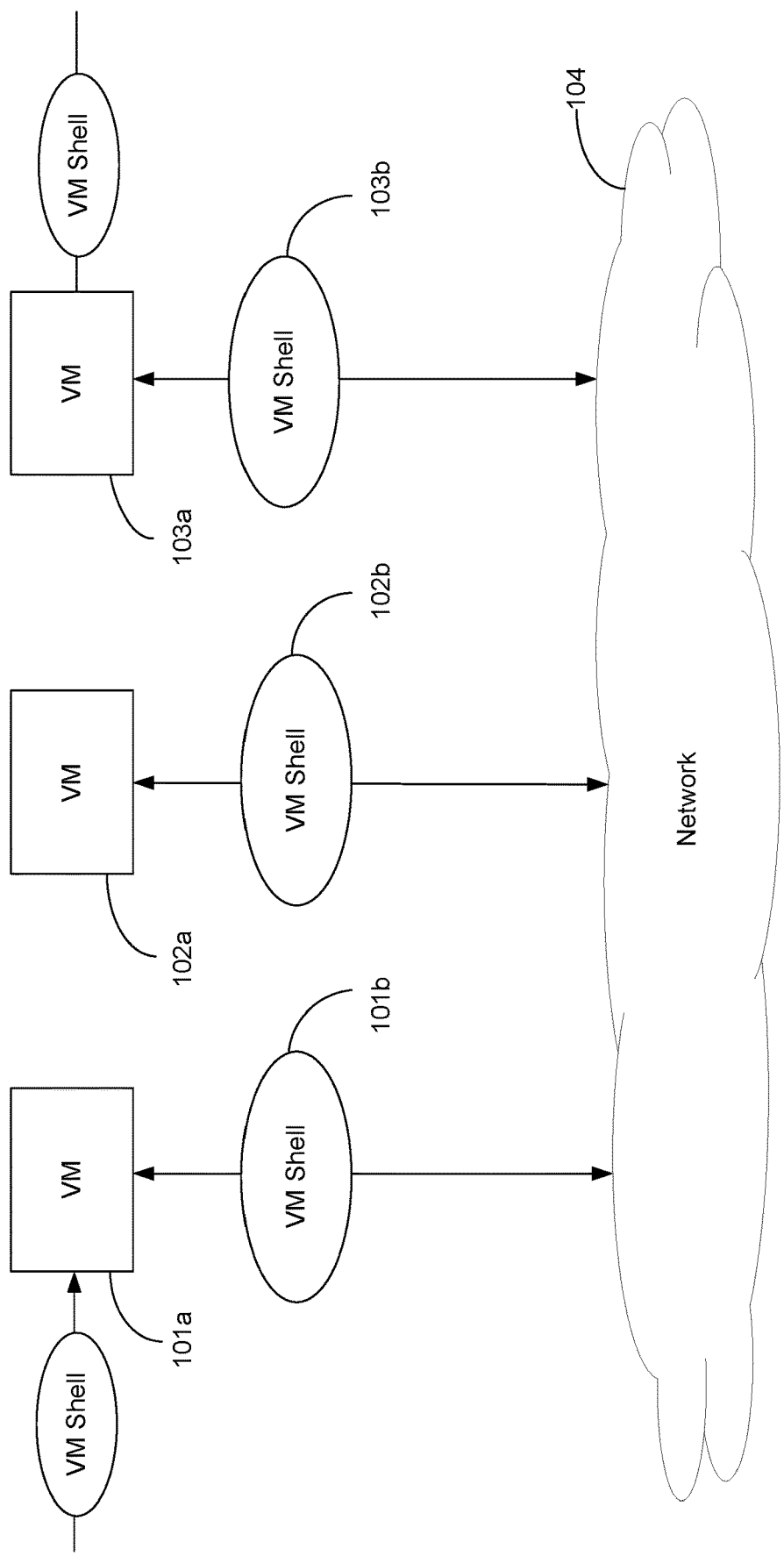
FIG. 2 illustrates an exemplary system for cloud traffic migration that may counter suspected harmful traffic.

FIG. 1 illustrates an exemplary system 100 for cloud traffic migration that may counter suspected harmful traffic. System 100 may include virtual machine (VM) 101a, VM 102a, VM 103a, or orchestrator 105a, which are respectively associated with VM shell 101b, VM shell 102b, VM 103b, and shell orchestrator 105b. The VMs, orchestrator, and shells of system 100 may be communicatively connected with each, which may be via network 104. As shown in FIG. 2, the VMs may not be directly connected with each other, but only communicate with each other through each VM shell. System 100 may further separate the control plane from data processing for more agility and better control and reaction to errors or other malfunctions that may cause performance issues.

With continued reference to FIG. 1, orchestrator 105a may include shell orchestrator 105b. Shell orchestrator 105b may analyze the VM configuration file of VMs (e.g., VM 101a, VM 102a, or VM 103a) and extract a) security policies (e.g., the kind of protocols that can be accepted by the VM, the kind of packets that can be accepted, directional traffic allowed, or bidirectional traffic allowed), and b) networking information (e.g., internet protocol address, MAC address, ports, or routes). This extracted information may be used to spin-up (e.g., create) a VM shell (e.g., VM shell 101b), which may be orchestrated by shell orchestrator 105b. VM shells may maintain connections with the shell orchestrator 105b (e.g., for coordination) and shell orchestrator 105b may send new policies to the VM shells so each VM shell may implement the policy based on the perspective of the corresponding VM. A single VM shell may be used by a plurality of VMs of the same type.

VM shell 101b may function as a) a customized dedicated firewall for a specific VM (e.g., VM 101a) and b) networking shell that will avoid disruptions in routing in case there are updates to VM 101a or security breaches. VM shell 101b may be considered a lean version of VM 101a that has minimal amount of code and functionalities (to minimize the attack surface). VM shell 101b may be placed on a direct route to VM 101a and may be spun-up on different hardware platforms other than the actual hardware associated with VM 101a. VM shell 101b may monitor the traffic in and from VM 101a to ensure compliance of security (e.g., allowed protocols or authorized users) or operational perspectives. With regard to operational perspectives, VM shell 101b may make sure requests (or connections) spend appropriate time communicating with VM 101a and do not unnecessarily linger (e.g., appropriate connection time length or ACK or NACK is received in appropriate time period).

VM shell 101b may monitor the platform (e.g., hardware or software) under VM 101a to enforce polices that may be provided by shell orchestrator 105b. For example, VM shell 101b may ensure that there are no central processing unit (CPU) or memory usage spikes that reach a threshold level and are indicative of an attack. The normal levels (e.g., average or median) can be learned over time and then threshold levels indicating abnormalities may be set for operation of VM 101a (e.g., compare CPU usage, memory usage, types of data traffic, or current number of requests or data traffic into VM 101a to normal levels). VM shell 101b may monitor the platform for operation that is within a suitable threshold level for VM 101a and VM shell 101b may request changes or send alarms in case threshold level indicating an anomaly or failure is reached. In an example change, VM shell 101b may request more VMs (e.g., VM 102a or VM 103a) to be spun-up based on increase of traffic before VM 101a crashes or suffers some other reduction in a threshold performance (e.g., associated with CPU, memory, latency, or bandwidth). As discussed in more detail herein, in another example, VM shell 101b may add delay to suspected denial of service (DOS) traffic before forwarding to VM 101a. VM shell 101b may send alerts (e.g., vibration of a mobile device, a text message, an email, or sound) in case an anomalous condition is detected (e.g., a threshold performance level is reached). VM shell 101b may be dynamically triggered to respond to different situations (e.g., situations associated with inside VM 101a or traffic coming to VM 101a).

The disclosed VMs or VM shells may be managed by a virtual machine monitor (e.g., hypervisor). The virtual machine monitor may provide a shared virtual operating platform and enable a plurality of different virtual machines to be instantiated and run on computing hardware.

Figure 3:
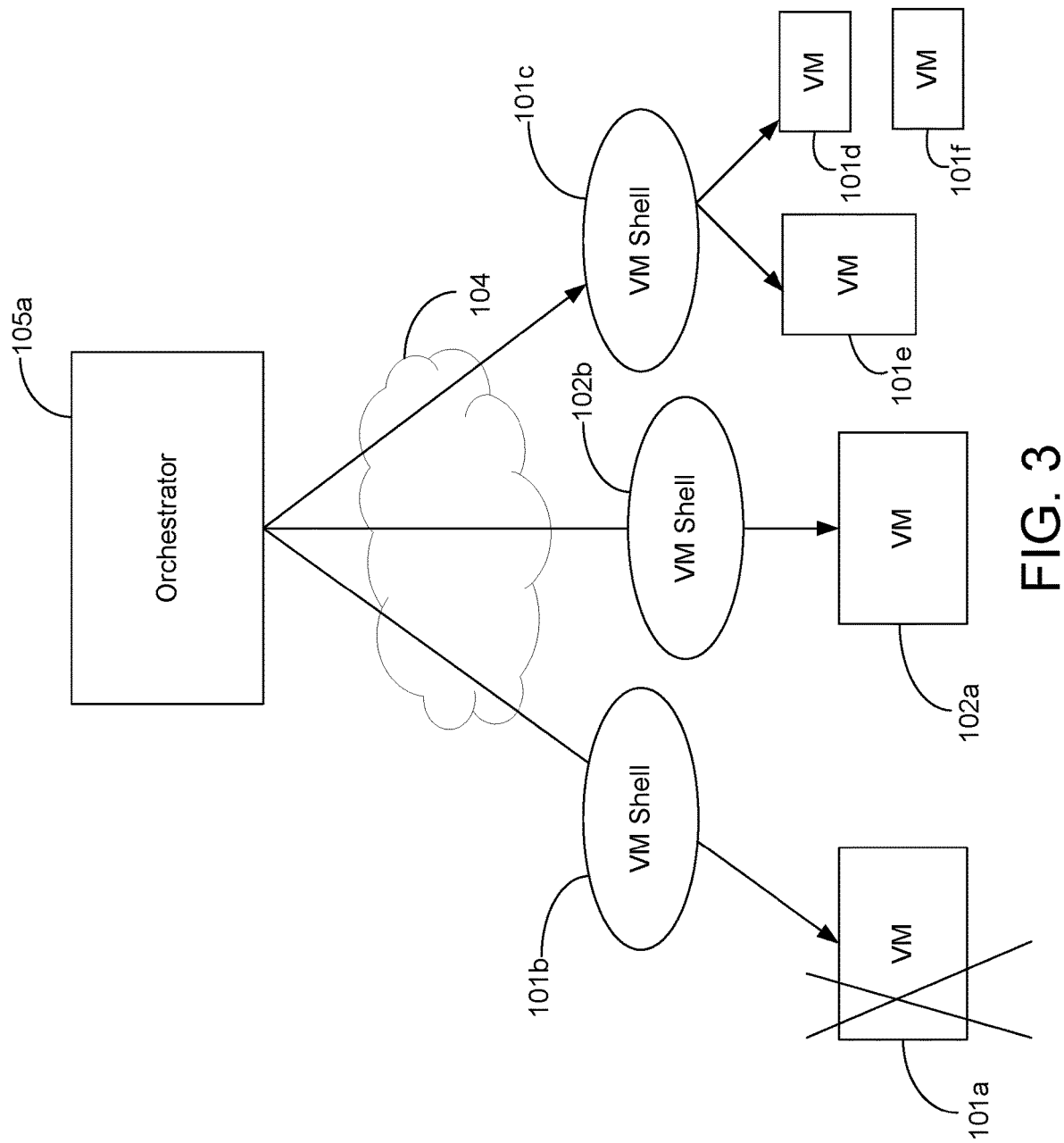
FIG. 3 illustrates an exemplary system for cloud traffic migration that may counter suspected harmful traffic.

FIG. 3 illustrates an exemplary scenario associated with cloud traffic migration that may counter suspected harmful traffic. In this scenario, VM 101a may be infected by something harmful that causes VM 101a to malfunction (e.g., shutdown, errors, slow response, or the like). As shown in FIG. 3 and further addressed in FIG. 4, the compromised VM 101a may be proactively shutdown and a duplicate VM shell or sub VMs may be created to address the malfunction of VM 101.

Figure 4:
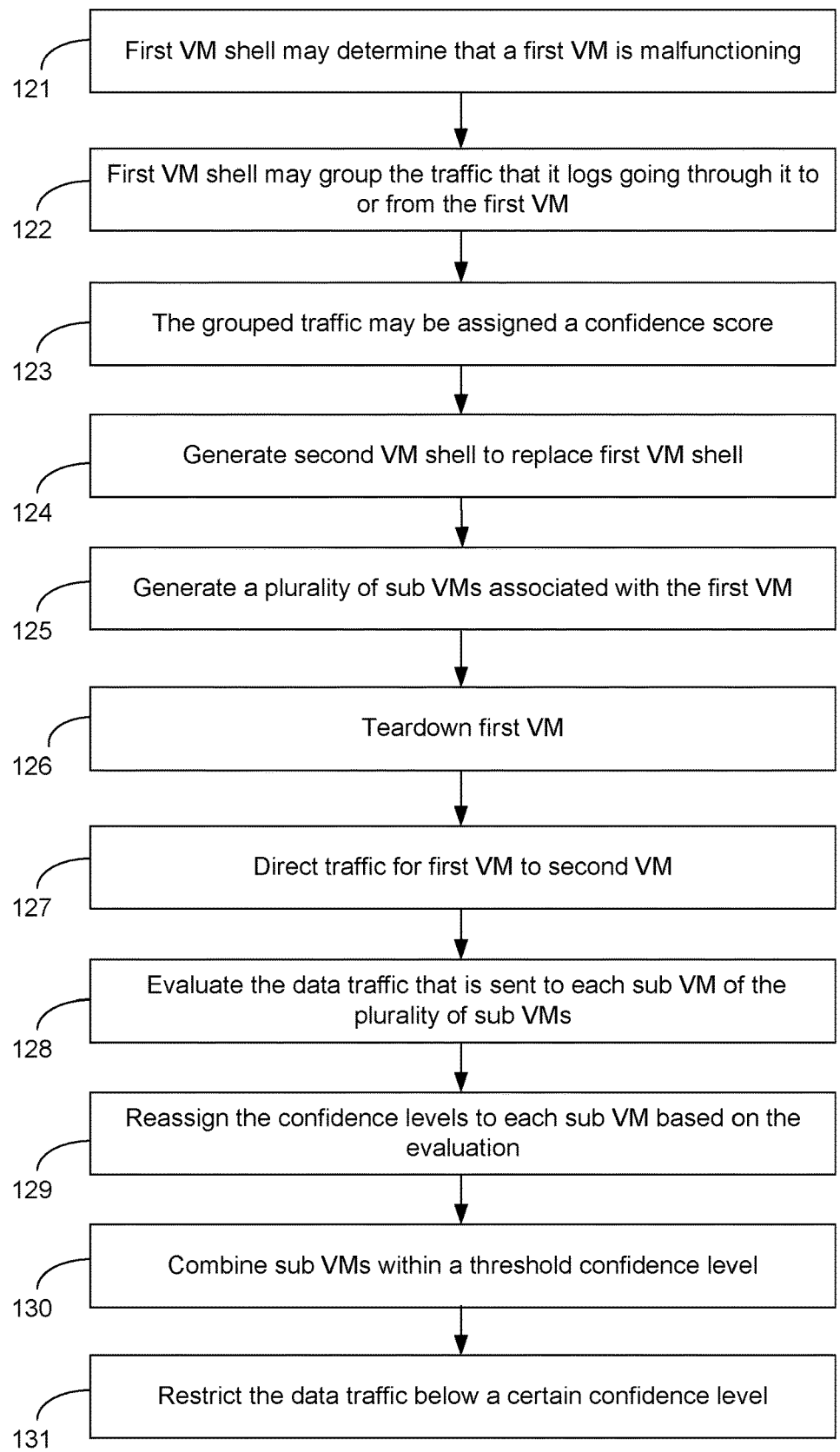
FIG. 4 illustrates an exemplary method for cloud traffic migration that may counter suspected harmful traffic.

FIG. 4 illustrates an exemplary method associated with cloud traffic migration that may counter suspected harmful traffic. At step 121, VM shell 101b may determine that VM 101a is malfunctioning. In this scenario, VM shell 101b may have not initially detected that traffic sent to or from VM 101a was harmful. VM shell 101b (or VM 101a) may determine that VM 101a is malfunctioning based on consumption of device resources, delays, multiple unsuccessful logins, or errors reaching a threshold level that may be indicative of a malfunction of VM 101a.

At step 122, VM shell 101b may group the traffic that it logs going through it to or from VM 101a. The grouping may proactively occur before a malfunction is determined in step 121 or the grouping may occur in response to determining a malfunction of VM 101a. The grouping may be based on behavior of the traffic, origin of the traffic going to VM 101a, or destination of the traffic leaving from VM 101a. For example, the grouping may be based on delays after receiving any traffic from a particular IP or time of malfunction proximate to the time multiple connections by a particular IP address, among other things. VM 101a or VM shell 101b may have an intelligent module that is aware of the components and functionalities of VM 101a, as well as the expected traffic paths inside VM 101a. The traffic entering VM 101a and the behavior inside VM 101a may be monitored. The monitored behaviors may include the following associated with one or more addresses or types of data traffic: a) average time spent inside VM 101a (e.g., abnormal delay before a response to a request); b) average number of processes engaged is abnormal; c) generated responses is abnormal (e.g., VM 101a responded with errors such as SIP Invite Invalid, Success, etc.); d) higher than normal failed authentications (compared to other requests on the same VM 101a); e) abnormal number of request time outs; f) abnormal central processing unit, bandwidth, or memory resource levels that are engaged with each request (e.g., identify those requests that exhaust those resources); g) origin and destination (e.g., too many requests from a single address, a subnet, or geographical area), or h) functionality that the data traffic is associated with (e.g., a first application, a second application, or the like) among other things. Abnormal may be considered reaching a determined threshold level of performance or action that indicates a behavior that is outside the normal.

At step 123, the grouped traffic may be assigned a confidence score. The confidence score may be an indicator of the likelihood that the grouped traffic may be not harmful traffic. In an example, a 20% confidence score may be indicative of harmful traffic, while 90% confidence score may be indicative that traffic is not harmful traffic. The confidence score may be based on one or more scores (e.g., a weighted scores) attributed to one or more behaviors.

At step 124, generate VM shell 101c, which may replace VM shell 101b. VM shell 101c may have the same IP addresses or MAC addresses and, when activated, VM shell 101c should receive the traffic previously destined to VM shell 101b. There should be little to no traffic disruption and the duplicated connections or interfaces should keep the connections that VM 101a had with other elements.

At step 125, generate a plurality of VMs (e.g., VM 101d, VM 101e, or VM 101f) that may be called sub VMs. Each sub VM may in totality have the same functions as VM 101a, but have been split into sub VMs (e.g., VM 101d, VM 101e, or VM 101f) in order to help determine the data traffic that is the root cause of causing harm to VM 101a. The sub VMs may have different functionality or duplicate functionality but process different types of data traffic. The functionality of the sub VMs may be based on a plurality of different factors. For example, VM 10d may handle the data traffic that is grouped as "higher than normal failed authentications," while VM 101 may handle the data traffic that is grouped as "average number of processes engaged is abnormal." VM shell 101c may direct the data traffic to the appropriate sub VM based on the determined group. The number of sub VMs may be restricted by the number of groupings of step 122 the data traffic is assigned to.

At step 126, restrict, redirect, or otherwise stop (e.g., teardown or shutdown) traffic to VM 101a. At step 127, direct traffic for VM 101a to VM shell 101c, which may be based on the actions of step 126. VM shell 101c should be activated and based on the type of data traffic, VM shell 101c directs the data traffic to one of the subVMs (e.g., VM 101d, VM 101e, or VM 101f).

At step 128, evaluate the data traffic of step 127 that is sent to each sub VM (e.g., deep packet inspection, run unsandbox, etc.). At step 129, after a threshold time period has been reached or some other trigger, reassigning the confidence levels to each sub VM based on the evaluation of step 128. At step 130, based on the reassigned confidence levels, combining sub VMs within a threshold confidence level. For example, each sub VM between 90%-100% (e.g., VM 101d and VM 101e) may be combined. The data traffic that was separately directed to VM 101d and VM 101e may be directed to one VM 101d/101e (a single VM) by VM shell 101c after the combination.

At step 131, the data traffic of VM 101f may be regrouped into a plurality of sub VMs. The steps of evaluation, regrouping, and consolidation (e.g., combining) may continue to occur until the harmful data traffic is identified within a threshold confidence level. In addition or alternatively, regrouping and evaluating after a threshold number of times may automatically place traffic within a certain confidence level (e.g., less than 50% confidence level) into a status that requires additional rules (e.g., restrictions). These additional rules may be implemented by VM shell 101c or each sub VM. The additional rules may include restricting (e.g., stop or reduce) the access to certain folders, prohibiting requests for executing certain commands such as admin level commands, or more frequent alerts and logging of the data traffic, among other things. Additional rules may also include holding cells or emulated responses. The holding cells (e.g., delay elements or processes that hold the request for several milliseconds more in memory than usual) may be used to slow the data traffic down and therefore slow any possible hackers down. Emulated responses may be bogus responses meant to confuse a potential hacker. For example, when there is a database query, a bogus response of random numbers or characters may be generated and sent. Instead of just blocking the traffic, the implemented holding cells or emulated responses may allow for more data than usual to be collected about harmful data traffic (and possible hackers) that may be utilized for threat analytics and better responses by VM shells and VMs to harmful data traffic.

It is contemplated that VM shell 101b may detect harmful traffic coming from VM 101a and proactively alert other VM shells, such as VM shell 102b or VM shell 103b. It is further contemplated that the steps and functions disclosed herein may be distributed over multiple virtual or physical hardware or consolidated on a single virtual or physical hardware. For example, the steps of FIG. 4 may be distributed over VMs, shells, or orchestrators, such as step 121 being done by Orchestrator 105a or VM 101a. The methods and systems herein may apply to different virtualization (e.g., container). The VM shell may be placed at the VM's interface as a layer of protection and the VM shell may be separated from an already created VM.

Figure 5:
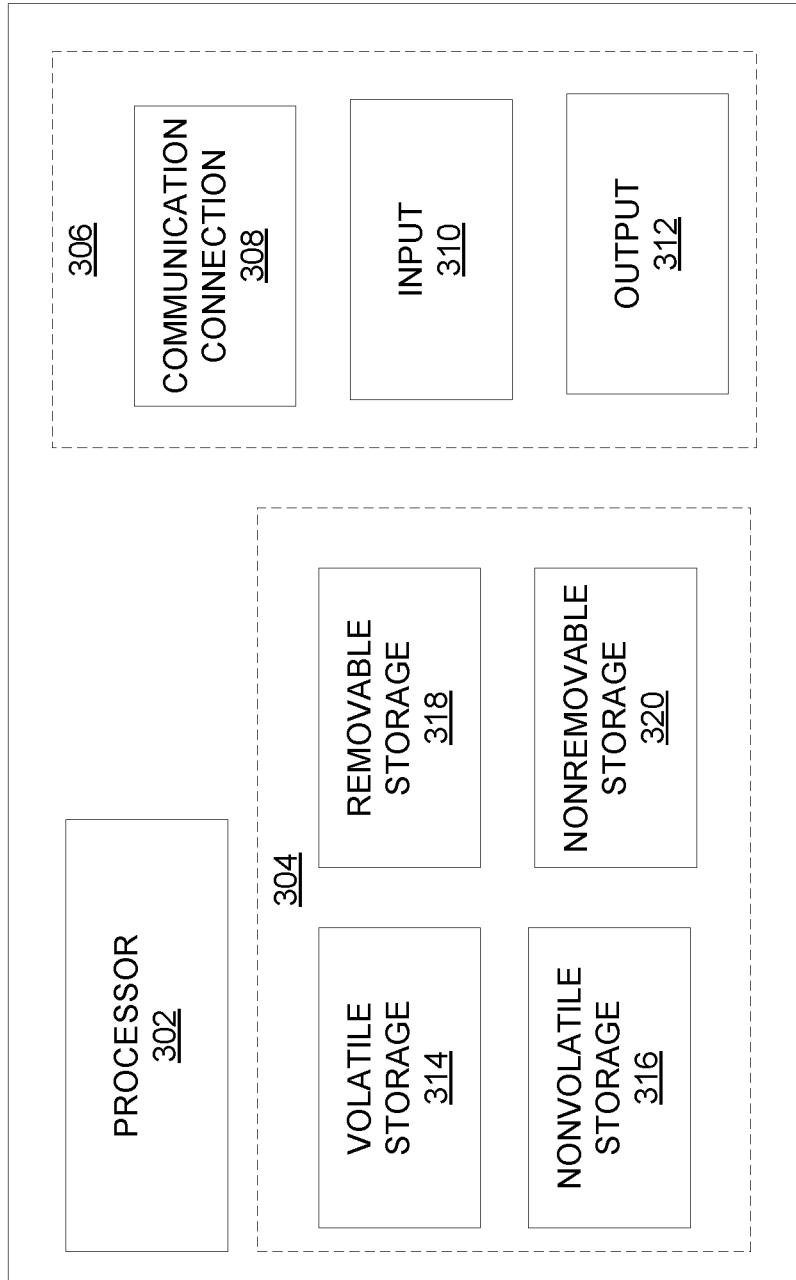
FIG. 5 illustrates a schematic of an exemplary network device.

FIG. 5 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
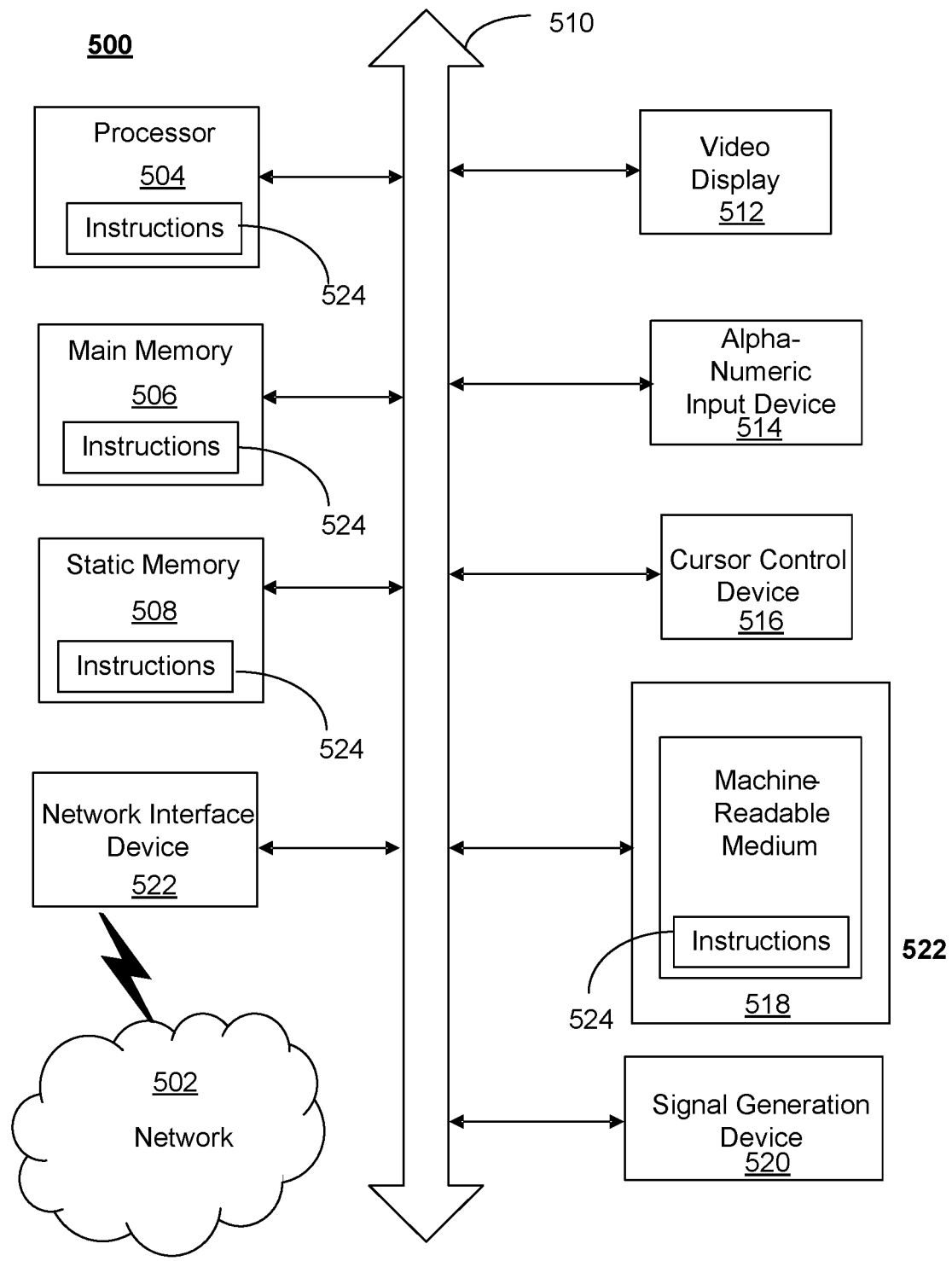
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, VM, Orchestrator, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment. VM shells may have similar configurations to a firewall configuration.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7A:
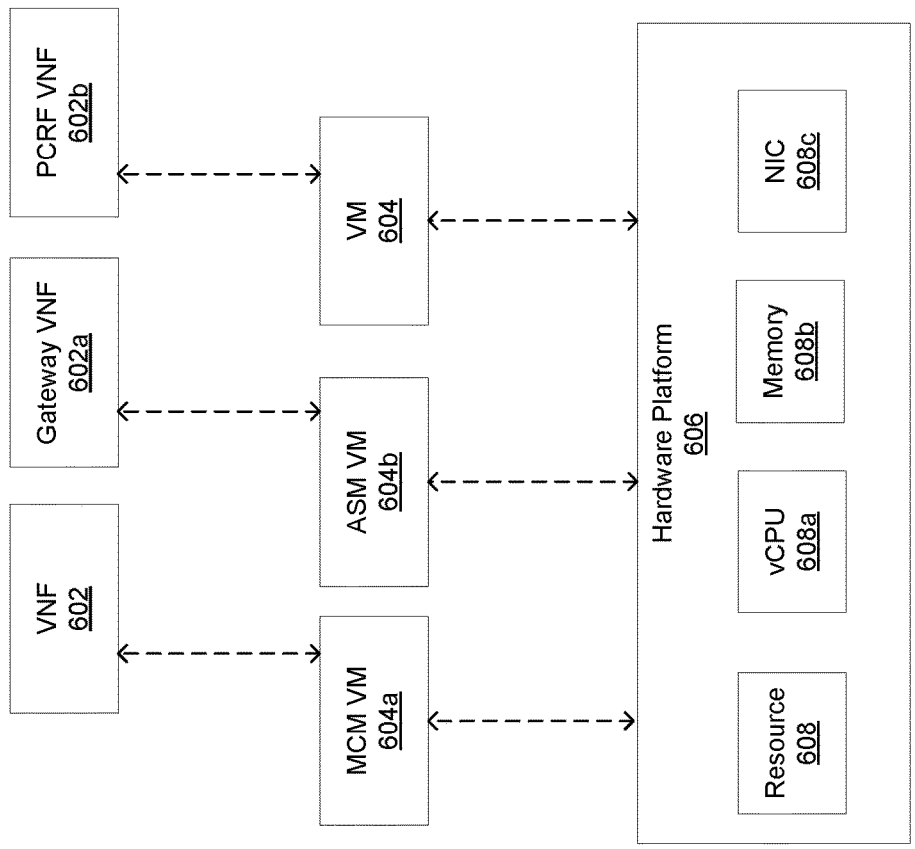
FIG. 7A is a representation of an exemplary network.

FIG. 7A is a representation of an exemplary network 600. Network 600 may include an SDN. For example, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 7A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 7A illustrates a management control module (MCM) VM 604a and an advanced services module (ASM) VM 604b. Additionally or alternatively, VMs 604 may include other types of VMs, such as a DEP VM (not shown). Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 7B:
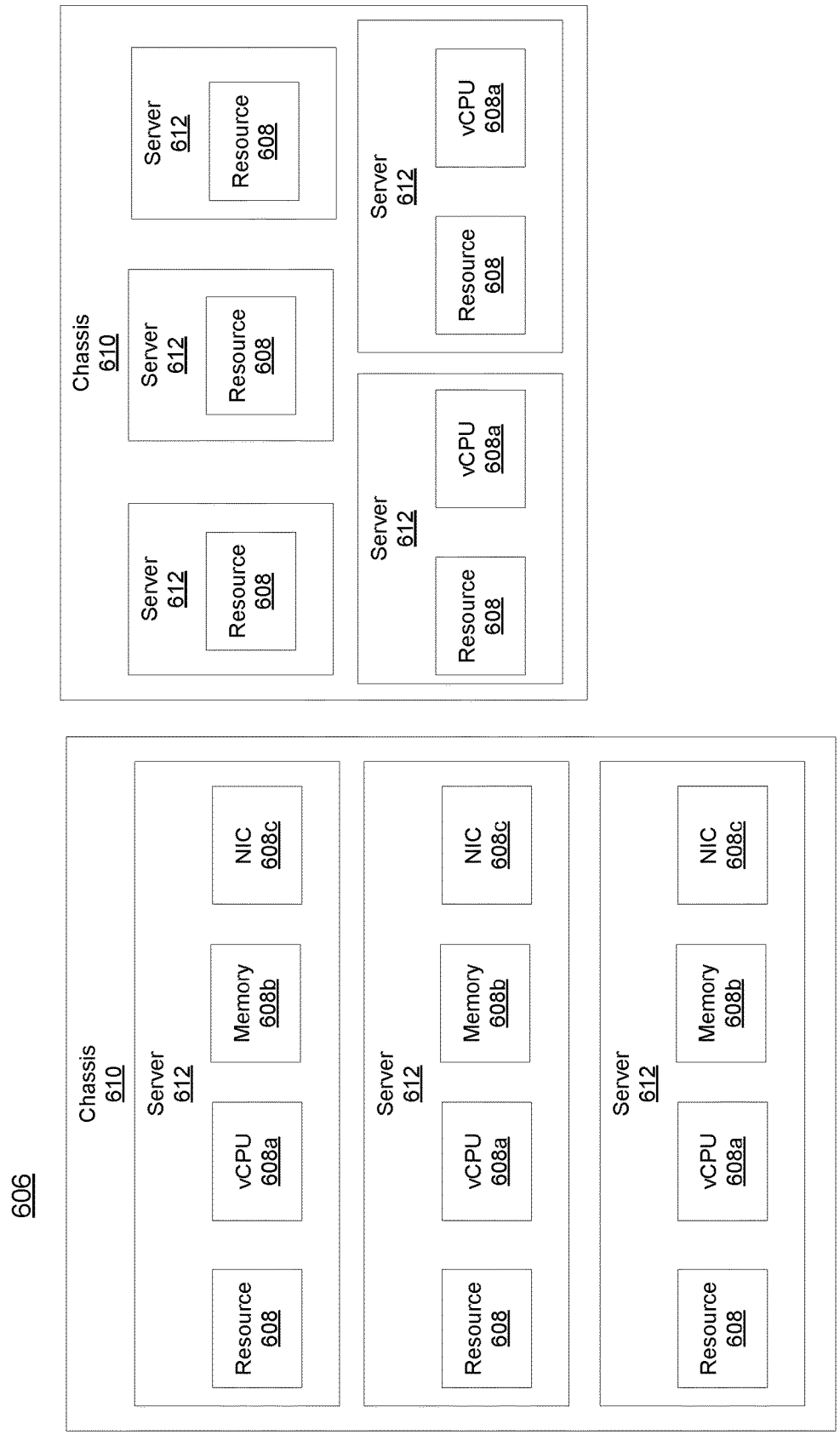
FIG. 7B is a representation of an exemplary hardware platform for a network.

While FIG. 7A illustrates resources 608 as collectively contained in hardware platform 606, the configuration of hardware platform 606 may isolate, for example, certain memory 608c from other memory 608c. FIG. 7B provides an exemplary implementation of hardware platform 606.

Hardware platform 606 may comprise one or more chassis 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chassis 610 may be communicatively coupled. Additionally or alternatively, chassis 610 may be communicatively coupled together (not shown) in any combination or arrangement.

The characteristics of each chassis 610 and each server 612 may differ. For example, FIG. 7B illustrates that the number of servers 612 within two chassis 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chassis 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have enough resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chassis 610 and servers 612 of hardware platform 606, and the individual resources 608 of each chassis 610 or server 612 (e.g., of a certain type), an integer programming problem may be formulated.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which cloud traffic migration alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—cloud traffic migration that may counter suspected harmful traffic—as illustrated in the Figures, specific terminology is employed for the sake of clarity. The claimed subject matter, however, is not intended to be limited to the specific terminology so selected, and it is to be understood that each specific element includes all technical equivalents. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples (e.g., skipping steps, combining steps, or adding steps between exemplary methods) are contemplated herein.

Methods, systems, and apparatuses, among other things, as described herein may provide for means for managing or operating cloud traffic migration that may counter suspected harmful traffic. The disclosed subject matter applies different virtualization technologies (e.g., containers). A method, system, computer readable storage medium, or apparatus may provide for determining that a first VM is malfunctioning. A first VM shell associated with the first VM may group the traffic that it logs going through it to or from the first VM. The first VM may do generally the data processing while the first VM shell may do most of the control plane processing. The grouped traffic may be assigned a confidence score (e.g., confidence level). A second VM shell may be generated to replace first VM shell. A plurality of sub VMs that will replace the first VM may be generated. The first VM may be shutdown or cutoff from the network routing or switching. Traffic previously destined for the first VM may be sent to the second VM. The traffic passing through the second VM shell may be evaluated and the data traffic may be sent to each sub VM of the plurality of sub VMs. Confidence levels to each sub VM may be reassigned (e.g., recalculated) based on the evaluation. Based on the new confidence levels combining sub VMs within a threshold confidence level. This may reduce the number of sub VMs being used. Based on the new set of sub VMs, restricting the data traffic of below a certain confidence level. All combinations in this and the below paragraph (including the removal or addition of steps) are contemplated in a manner that is consistent with the other portions of the detailed description.

The method, system, computer readable storage medium, or apparatus may provide for determining that a first virtual machine (VM) has malfunctioned; based on the malfunction, obtaining logs of data traffic to (or from) the first VM at a first period; based on the log of data traffic to the first VM at the first period, assigning the data traffic to a plurality of groups of data traffic; assigning a confidence score to each group of the plurality of groups of data traffic; and generating a plurality of sub VMs for each group of the plurality of groups of data traffic. The data traffic to the first VM at the first period passes through a first VM shell. The method, system, computer readable storage medium, or apparatus may provide for generating a second VM shell, wherein the second VM shell is an interface to the plurality of sub VMs, wherein the data traffic at a second period passes through the second VM shell. The method, system, computer readable storage medium, or apparatus may provide for redirecting the data traffic at a second period to a second VM shell, wherein the second VM shell is an interface to the plurality of sub VMs; evaluating the data traffic at the second period; based on the evaluating, reassigning a respective confidence score to each of the plurality of sub VMs; and based on the reassigning, combining a subset of the plurality of sub VMs that are within a threshold confidence score. The method, system, computer readable storage medium, or apparatus may provide for restricting access to functionality of the data traffic directed to a sub VM of the plurality of sub VMs that has a confidence score that is indicative of harmful data traffic. The assigning of the data traffic to the plurality of groups of data traffic may be based on monitored behavior, the monitored behavior may include average number of processes engaged of the data traffic at the first period, average number of failed authentications of the data traffic at the first period, origin or destination of the data traffic at the first period, or the like. The method, system, computer readable storage medium, or apparatus may provide for redirecting the data traffic at a second period to a second VM shell, wherein the second VM shell is an interface to the plurality of sub VMs, wherein the plurality of sub VMs are assigned a respective first confidence score; and based on an evaluation of the data of the second period, reassigning a respective second confidence score to each of the plurality of sub VMs. All combinations in this paragraph (including the removal or addition of steps) are contemplated in a manner that is consistent with the other portions of the detailed description.

What is claimed:

1. A device comprising:
   a processing system including a processor; and
   a memory storing executable instructions that, when executed by the processing system, facilitate performance of operations comprising:
   determining that a first virtual machine (VM) has a malfunction;
   obtaining, at a first period, logs of data traffic at the first VM, wherein the data traffic to the first VM at the first period passes through a first VM shell;
   assigning the data traffic to a plurality of groups of data traffic;
   generating a sub VM for each group of the plurality of groups of data traffic, resulting in a plurality of sub VMs;
   generating a second VM shell, wherein the second VM shell is an interface to the plurality of sub VMs, wherein second data traffic at a second period passes through the second VM shell before being directed to each respective sub VM;
   redirecting data traffic for the first VM shell and the first VM to the second VM shell and the plurality of sub VMs, wherein each sub VM receives incoming data traffic associated with its respective assigned group;
   evaluating the second data traffic to determine a confidence score for each of the plurality of sub VMs indicating a likelihood that a portion of the second data traffic associated with a respective sub VM has not caused the malfunction;
   in accordance with the evaluating, consolidating the sub VMs having confidence scores meeting a first threshold confidence level into a single sub VM;
   subsequent to the consolidating, identifying data traffic causing the malfunction based on data traffic associated with sub VMs having a confidence score that does not meet the first threshold confidence level; and
   restricting the sub VMs having a confidence score that does not meet the first threshold confidence level in accordance with a predetermined restriction policy, the restricting including at least one of: limiting access to one or more predefined folders or prohibiting requests for executing one or more predefined commands.

2. The device of claim 1, wherein the operations further comprise assigning a confidence score to the data traffic through the first VM at the first period.

3. The device of claim 1, wherein the first threshold confidence level corresponds to a 90% likelihood.

4. The device of claim 1, wherein the data traffic causing the malfunction is identified based on the confidence score for that data traffic being less than a second threshold confidence level.

5. The device of claim 1, wherein the assigning of the data traffic to the plurality of groups of data traffic is based on a monitored behavior, the monitored behavior comprising an average number of processes engaged of the data traffic at the first period.

6. The device of claim 1, wherein the assigning of the data traffic to the plurality of groups of data traffic is based on monitored behavior, the monitored behavior comprising an average number of failed authentications of the data traffic at the first period.

7. The device of claim 1, wherein the assigning of the data traffic to the plurality of groups of data traffic is based on monitored behavior, the monitored behavior comprising an origin or destination of the data traffic at the first period.

8. The device of claim 4 wherein the second threshold confidence level corresponds to a 50% likelihood.

9. A non-transitory machine-readable medium comprising executable instructions that, when executed by a processing system including a processor, facilitate performance of operations comprising:
   determining that a first virtual machine (VM) has a malfunction;
   obtaining, at a first period, logs of data traffic at the first VM that has malfunctioned, wherein the data traffic to the first VM at the first period passes through a first VM shell;
   assigning the data traffic to a plurality of groups of data traffic;
   generating a sub VM for each group of the plurality of groups of data traffic, resulting in a plurality of sub VMs;
   generating a second VM shell, wherein the second VM shell is an interface to the plurality of sub VMs, wherein second data traffic at a second period passes through the second VM shell before being directed to each respective sub VM;
   redirecting data traffic for the first VM shell and the first VM to the second VM shell and the plurality of sub VMs, wherein each sub VM receives incoming data traffic associated with its respective assigned group;
   evaluating the second data traffic of each sub VM of the plurality of sub VMs to determine a confidence score for each of the plurality of sub VMs indicating a likelihood that a portion of the second data traffic associated with a respective sub VM has not caused the malfunction;

in accordance with the evaluating, consolidating the sub VMs having confidence scores meeting a first threshold confidence level into a single sub VM; and subsequent to the consolidating, identifying data traffic causing the malfunction based on data traffic associated with sub VMs having a confidence score that does not meet the first threshold confidence level; and restricting the sub VMs having a confidence score that does not meet the first threshold confidence level in accordance with a predetermined restriction policy, the restricting including at least one of: limiting access to one or more predefined folders or prohibiting requests for executing one or more predefined commands.

10. The non-transitory machine-readable computer readable storage medium of claim 9 wherein the operations further comprise assigning a confidence score to the data traffic through the first VM at the first period.

11. The non-transitory machine-readable computer readable storage medium of claim 9, wherein the first threshold confidence level corresponds to a 90% likelihood.

12. The non-transitory machine-readable computer readable storage medium of claim 9, wherein the data traffic causing the malfunction is identified based on the confidence score for that data traffic being less than a second threshold confidence level.

13. The non-transitory machine-readable computer readable storage medium of claim 9 wherein the assigning of the data traffic to the plurality of groups of data traffic is based on monitored behavior, the monitored behavior comprising average number of failed authentications of the data traffic at the first period.

14. The non-transitory machine-readable computer readable storage medium of claim 9 wherein the assigning of the data traffic to the plurality of groups of data traffic is based on a monitored behavior, the monitored behavior comprising average number of processes engaged of the data traffic at the first period.

15. The non-transitory machine-readable computer readable storage medium of claim 12, wherein the second threshold confidence level corresponds to a 50% likelihood.

16. A method comprising:

determining, by a processing system, that a first virtual machine (VM) has a malfunction;

obtaining, by the processing system, at a first period, logs of data traffic at the first VM, wherein the data traffic to the first VM at the first period passes through a first VM shell;

assigning, by the processing system, the data traffic to a plurality of groups of data traffic;

generating, by the processing system, a sub VM for each group of the plurality of groups of data traffic, resulting in a plurality of sub VMs;

generating, by the processing system, a second VM shell, wherein the second VM shell is an interface to the plurality of sub VMs, wherein second data traffic at a second period passes through the second VM shell before being directed to each respective sub VM;

redirecting, by the processing system, data traffic for the first VM shell and the first VM to the second VM shell and the plurality of sub VMs, wherein each sub VM receives incoming data traffic associated with its respective assigned group;

evaluating, by the processing system, the second data traffic of each sub VM of the plurality of sub VMs to determine a confidence score for each of the plurality of sub VMs indicating a likelihood that a portion of the second the data traffic of that associated with a respective sub VM has not caused the malfunction;

in accordance with the evaluating, consolidating, by the processing system, the sub VMs having confidence scores meeting a first threshold confidence level into a single sub VM; and subsequent to the consolidating, by the processing system, identifying data traffic causing the malfunction based on data traffic associated with sub VMs having a confidence score that does not meet the first threshold confidence level; and restricting, by the processing system, the sub VMs having a confidence score that does not meet the first threshold confidence level in accordance with a predetermined restriction policy, the restricting including at least one of: limiting access to one or more predefined folders or prohibiting requests for executing one or more predefined commands.

17. The method of claim 16, wherein the assigning of the data traffic to the plurality of groups of data traffic is based on a monitored behavior, the monitored behavior comprising an average number of processes engaged of the data traffic at the first period.

18. The method of claim 16, wherein the assigning of the data traffic to the plurality of groups of data traffic is based on monitored behavior, the monitored behavior comprising an average number of failed authentications of the data traffic at the first period.

19. The method of claim 16, wherein the assigning of the data traffic to the plurality of groups of data traffic is based on monitored behavior, the monitored behavior comprising an origin or destination of the data traffic at the first period.

20. The method of claim 16, wherein the data traffic causing the malfunction is identified based on the confidence score for that data traffic being less than a second threshold confidence level.

* * * * *

UNITED STATES PATENT AND TRADEMARK OFFICE
CERTIFICATE OF CORRECTION

PATENT NO. : 11,422,845 B2
APPLICATION NO. : 16/712235
DATED : August 23, 2022
INVENTOR(S) : Joseph Soryal et al.

It is certified that error appears in the above-identified patent and that said Letters Patent is hereby corrected as shown below:

In the Claims

Claim 10, Lines 17-18, the words "computer readable storage" should be removed.

Claim 11, Lines 22-23, the words "computer readable storage" should be removed.

Claim 12, Lines 25-26, the words "computer readable storage" should be removed.

Claim 13, Lines 30-31, the words "computer readable storage" should be removed.

Claim 14, Lines 36-37, the words "computer readable storage" should be removed.

Claim 15, Lines 42-43, the words "computer readable storage" should be removed.

Signed and Sealed this
Fourth Day of October, 2022

Katherine Kelly Vidal
*Director of the United States Patent and Trademark Office*